(12) United States Patent
Yu

(10) Patent No.: US 7,008,581 B1
(45) Date of Patent: Mar. 7, 2006

(54) ORNAMENTAL ARTICLE AND MANUFACTURING METHOD THEREOF

(76) Inventor: Yung-Chin Yu, No. 18, Yen-Tsuo Lane, Hai-Pu Li, Lu Kang Chen, Chang Hua Hsien (TW)

( * ) Notice: Subject to any disclaimer, the term of this patent is extended or adjusted under 35 U.S.C. 154(b) by 96 days.

(21) Appl. No.: 10/340,822

(22) Filed: Jan. 13, 2003

(51) Int. Cl.
*B29C 43/02* (2006.01)
*B29C 43/20* (2006.01)

(52) U.S. Cl. ............... 264/132; 264/134; 264/322

(58) Field of Classification Search .......... 446/117, 446/486; 264/132, 134, 322; 267/69; D21/468
See application file for complete search history.

(56) References Cited

U.S. PATENT DOCUMENTS

| | | | | |
|---|---|---|---|---|
| 3,302,311 A | * | 2/1967 | Israel | 434/402 |
| 4,114,306 A | * | 9/1978 | Molenaar | 446/486 |
| 4,234,188 A | * | 11/1980 | Keegan | 273/290 |
| 5,259,619 A | * | 11/1993 | Rosewarne | 273/153 R |
| 5,318,054 A | * | 6/1994 | Neilson et al. | 132/273 |
| D360,437 S | * | 7/1995 | Huang | D21/468 |
| 5,435,518 A | * | 7/1995 | Iguchi | 249/55 |
| 5,458,109 A | * | 10/1995 | Tu | 132/279 |
| 5,715,948 A | * | 2/1998 | Hung | 211/40 |
| 6,192,893 B1 | * | 2/2001 | Katsumata | 132/273 |
| 6,224,453 B1 | * | 5/2001 | McKinley et al. | 446/69 |

* cited by examiner

*Primary Examiner*—Mary Lynn Theisen
(74) *Attorney, Agent, or Firm*—Egbert Law Offices

(57) ABSTRACT

An ornamental article has a shape and a plurality of sides and angles. The sides are simultaneously patterned in the course of a process by which the ornamental article is made.

1 Claim, 3 Drawing Sheets

ORNAMENTAL ARTICLE AND MANUFACTURING METHOD THEREOF

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an ornament, and more particularly to a desktop ornament, which can be also used as a paperweight, or pen holder.

BACKGROUND OF THE INVENTION

The conventional desktop ornament has the shape of a cylinder, whether hollow or solid. In the course of making the ornament, the surface of the ornament is marked with various patterns by a roller carrying the printing plates, so as to enhance the decorative effect of the ornament. Such a cylindrical ornament as described above can be made economically. However, if the ornament is made to have an irregular or polygonal shape, the surface of the ornament can not be patterned by the roller. For this reason, the sides of the irregular or polygonal ornament must be separately patterned at additional cost. In light of the high cost of making such a patterned irregular or polygonal ornament, the ornament is in fact not patterned at all and therefore has a monotonous look.

BRIEF SUMMARY OF THE INVENTION

The primary objective of the present invention is to provide an ornamental article which has a form and a patterned profile.

It is another objective of the present invention to provide a method for making a patterned ornament at a low cost, regardless of the shape of the ornament.

The features and the advantages of the present invention will be more readily understood upon a thoughtful deliberation of the following detailed description of the present invention with reference to the accompanying drawings.

DETAILED DESCRIPTION OF THE INVENTION

Figure 1:
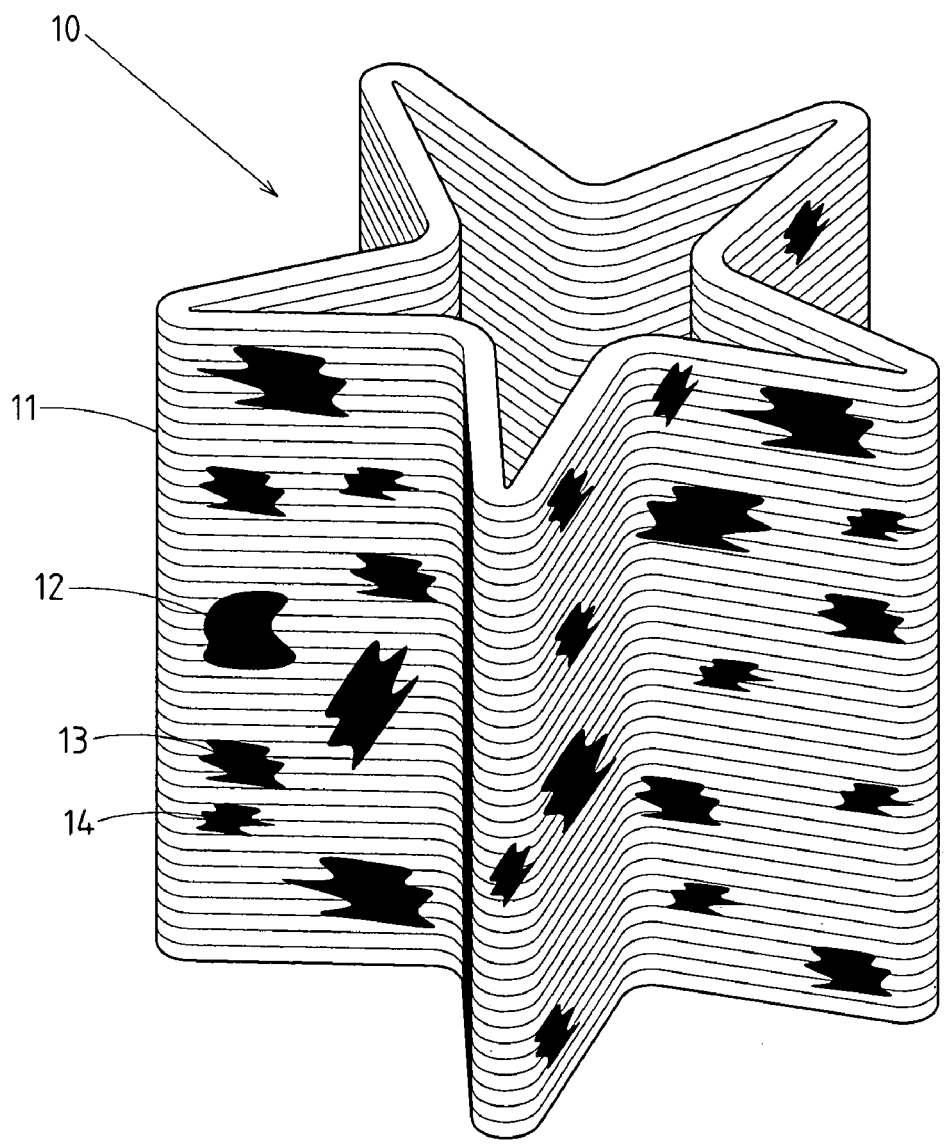
FIG. 1 shows a perspective view of an ornamental article of the present invention.

As shown in FIG. 1, an ornamental article 10 embodied in the present invention has a polygonal shape and a hollow interior. The ornamental article 10 further has a profile 11 which is provided with various patterns 12, 13, and 14. In another words, each side of the polygonal ornamental article 10 is patterned in the course of making the polygonal ornamental article 10.

The ornamental article 10 of the present invention may be solid. The shape of the ornamental article 10 of the present invention may be triangular, regular, or irregular.

Figure 2:
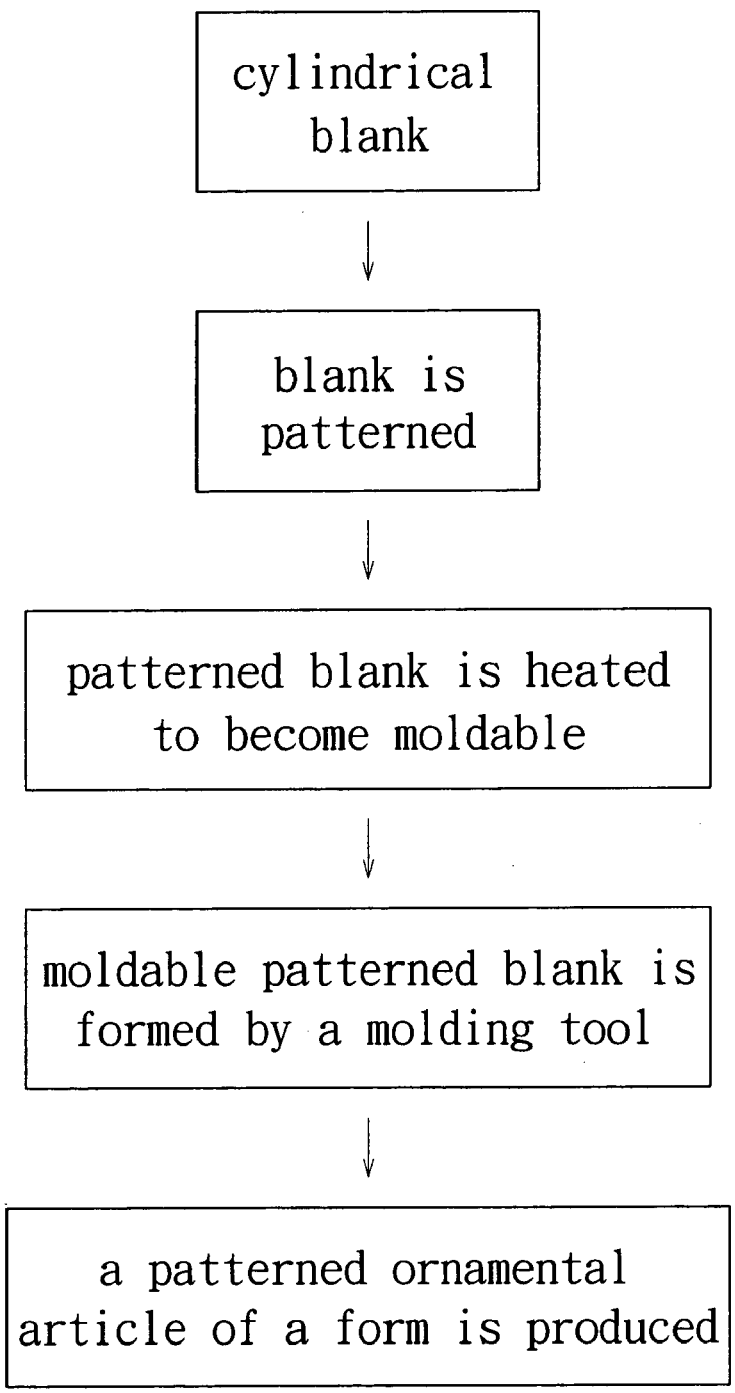
FIG. 2 shows a block diagram of a method for making the ornamental article of the present invention.
Figure 3:
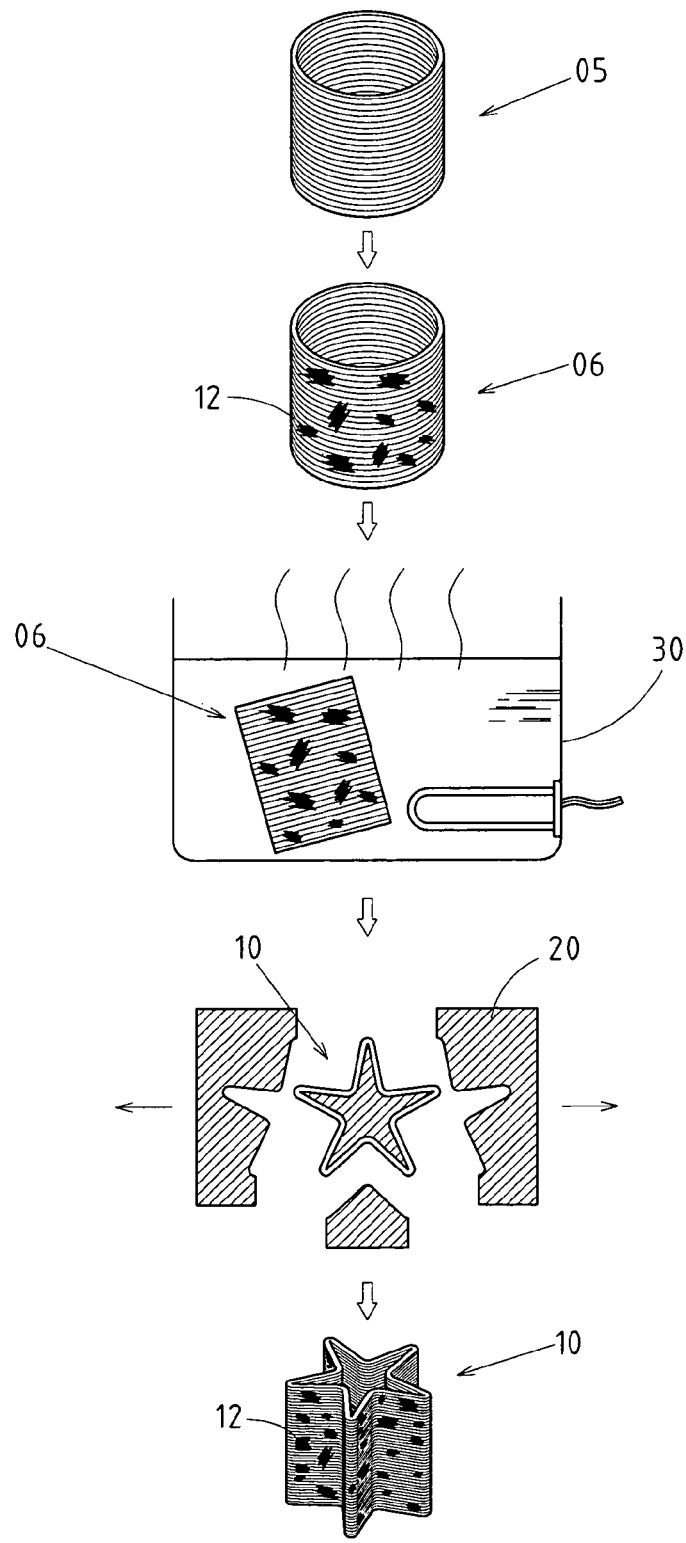
FIG. 3 shows a schematic illustration of the process flow of the present invention.

As illustrated in FIGS. 2 and 3, a method embodied in the present invention is used to make the ornamental article 10 of the present invention. The method comprises a first step in which a cylindrical blank 05 is prepared. The cylindrical blank 05 can be easily patterned by a roller (not shown in the drawings.) The patterned blank 06 is then heated by a heating device 30 in such a way that the patterned blank 06 becomes moldable. The moldable patterned blank 06 is then shaped by a molding tool 20 to become a patterned ornamental article 10 of a polygonal profile. Regardless of the form of an end product of the method of the present invention, the end product is economically patterned by virtue of the cylindrical blank which can be easily patterned in its entirety by a roller carrying the printing plates.

The present invention described above is to be regarded in all respects as being illustrative and nonrestrictive. Accordingly, the present invention may be embodied in other specific forms without deviating from the spirit thereof. The present invention is therefore to be limited only by the scope of the following claims.

I claim:

1. A process for manufacturing an ornamental article comprising:

printing a pattern on an exterior surface of a cylindrical blank;

heating the printed cylindrical blank to a moldable temperature; and molding the heated blank into a polygonal member having a plurality of angles and a plurality of sides formed on an exterior surface thereof, said polygonal member having a generally flat bottom and a hollow interior, said hollow interior having a shape generally corresponding to a shape of said exterior surface of said polygonal member, each of said plurality of sides having the pattern thereon.

* * * * *